UNITED STATES PATENT OFFICE.

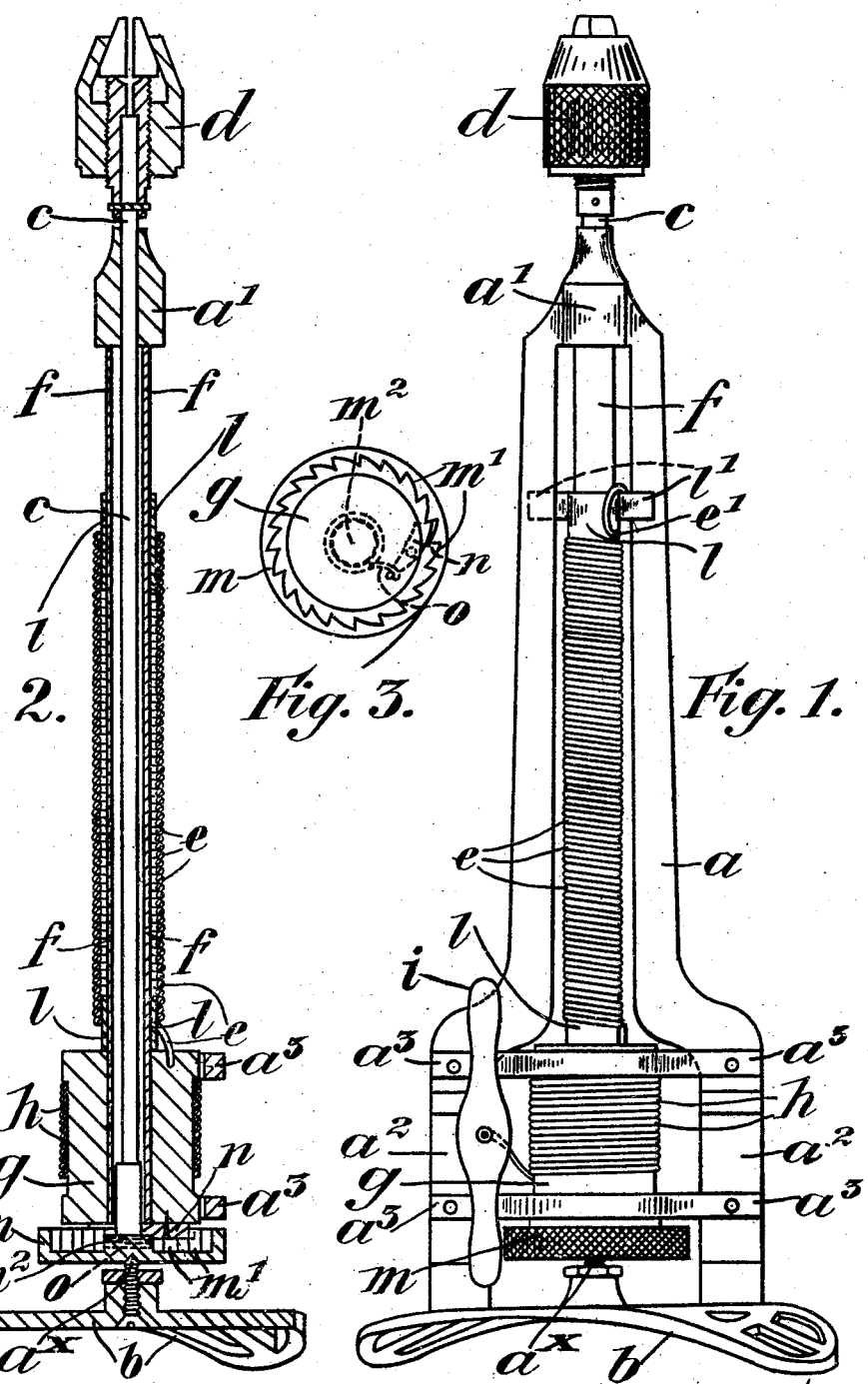

ALEXANDER McGREGOR, OF GLASGOW, SCOTLAND.

REACTION SPRING DRILL OR BRACE.

No. 929,465.  Specification of Letters Patent.  Patented July 27, 1909.

Application filed March 25, 1908. Serial No. 423,104.

*To all whom it may concern:*

Be it known that I, ALEXANDER MC-GREGOR, residing at 8 Jail Square, Glasgow, Scotland, a subject of the King of Great Britain, have invented certain new and useful Improved Reaction Spring Drills or Braces, of which the following is a specification.

This invention relates to re-action spring drills or braces and has for its object to improve their construction.

Under my invention I provide a drill or brace the parts whereof are so shaped and arranged as to facilitate the handling and using of the same, the frame being made so that it extends alongside the spindle carrying the tool holder or chuck with just sufficient room for the torsion spring (which gives the return action to the drum) to move between the sides thereof. I also provide improved spring mechanism for operating the drill consisting of a drum or the like rotated by means of a cord or the like, the drum being connected to a torsion spring, said torsion spring being wound around a sleeve, held in position and fitted around a second sleeve inclosing the spindle. The torsion spring is wound or twisted up and has in combination therewith a clutch which, when the tool is at work, allows of the drum rotating in the reverse direction under the return action of the spring.

The new drill can be used as a breast, vise or hand drill.

In order that my invention may be clearly understood I have hereunto appended explanatory drawings, whereon:—

Figure 1 is a side view of a hand drill made in accordance with this invention. Fig. 2 is a sectional view of the same. Fig. 3 is a detail view of the clutch arrangement.

On the drawings the same reference letters indicate the same parts.

In carrying out my invention I provide a frame $a$ which may be made of aluminium or of any other suitable material and is, preferably, of rectangular section throughout, though any other desired section of material may be used. At the rear end of this frame $a$ I secure to or make one therewith a breast plate or equivalent $b$ which may be set at an angle and curved. Carried in the frame $a$ is a spindle $c$ which runs in a bearing $a^1$ at the front end of the frame $a$ and on a center $a^x$ at the back end thereof or on the breast plate $b$. The spindle $c$ carries at its front end a tool holder or chuck $d$.

The frame $a$ is preferably made so that, for the greater part of its length it extends along both sides of the spindle, with just sufficient room left between the sides to permit a torsion spring $e$, which is wound around the spindle, easily clearing the same when turning and sliding on the sleeve $f$ which incases the spindle. At the breast plate end the distance between the sides of the frame is increased so as to enable a small drum or spool $g$ to rotate between the sides $a^2$ thereof, said drum or spool $g$ being rotated by a cord $h$ or the like wound on the same and having one of its ends attached thereto and its other end provided with a handle $i$ to facilitate the pulling of same. This small drum $g$ is attached in any suitable manner to the sleeve $f$ which incases the spindle $c$ and extends from the end of the drum to the bearing $a^1$.

Attached in any suitable manner to the front end of the drum is the spiral spring $e$ which gives the return action to the drum. This spring, in the working rotation of the drum $g$ and spindle $c$ is turned and compressed, the upper end being held and prevented from turning by a sleeve $l$ with flaps or wings $l^1$ which engage with the two sides of the frame $a$ and bear on opposite faces thereof. To this sleeve $l$ the end $e^1$ of the spring $e$ is attached in any suitable manner, the sleeve $l$ being free to slide on and along the long sleeve $f$ which incases the spindle $c$.

The spindle $c$, at the end nearest the breast plate, is attached in any suitable manner to a clutch $m$ which may be in the form of a disk $m$ with teeth $m^1$ thereon. This disk $m$ rotates with the spindle, being rotated by means of the small drum or spool $g$ and the cord or the like $h$. On the breast plate end of the drum or spool $g$ is a pawl $n$ which engages with the teeth $m^1$ of the clutch $m$ in the working direction and in giving the driving action to the tool and which moves out of engagement with the teeth $m^1$ of the clutch $m$ in the backward or return motion of the drum, thereby permitting the clutch disk $m$ with the spindle $c$ attached thereto to remain stationary until the teeth $m^1$ are again engaged by the pawl $n$ in the next working rotation of the drum $g$. In order to retain the pawl in contact with the ratchet teeth at the working movement of the drum a spring $o$ is fitted to the pawl $n$ and wound around a boss $m^2$ on the clutch disk $m$.

On the extended part $a^2$ of the frame $a$ at the small drum or spool end thereof I preferably provide one or more guards $a^3$ which pass over the drum $g$ on the side from which the cord or the like $h$, which rotates the drum $g$ is pulled. These guards may be attached in any suitable manner to the sides of the frame and besides acting as guards over the drum also help to stiffen the frame $a$.

If desired a flat coil spring may be used in place of the spiral spring and if desired the drum $g$ may be made stepped to give various speeds.

I am aware it has already been proposed to make a drill or brace with the spindle driven by the action of a cord, line, or band wound around a shaft or drum and having a ratchet in combination with a recovery spring arrangement, to bring back the cord or line after each pull.

Having now fully described my invention what I claim and desire to secure by Letters Patent is:—

1. A portable drill comprising in combination a frame with parallel sides, a spindle carried in the frame, a drum, a clutch connection between the spindle and drum, means for winding the drum, a torsion device around said spindle, a sleeve surrounding said spindle and on which said torsion device is mounted to slide, said torsion device secured at one end to said drum, and means for holding the upper end of the torsion device against turning.

2. In combination, a frame with parallel sides, a spindle carried in the frame, a drum, means connecting said drum and spindle, winding means for the drum, a tubular sleeve surrounding the spindle, a coil spring surrounding said sleeve, said spring being connected at one end to the drum and at the other end to a sleeve adapted to slidably engage the frame.

3. In combination, a frame with parallel sides, a spindle carried in the frame, a freely fitted drum, a clutch on the spindle and adapted to connect with said drum, winding means for the drum, a tubular sleeve, a ring with an arm adapted to engage and slide on said frame and a coil spring surrounding said tubular sleeve and connected at the one end to said ring and at the other end to said drum.

4. In combination, a frame with parallel sides, a breast plate on the frame, a spindle carried in the frame, mounted at one end in a bearing on said breast plate, a drum carried in the frame, winding means for the drum, a clutch on said spindle and adapted to engage said drum, a tubular sleeve surrounding the spindle, a coil spring surrounding said sleeve and a ring with an arm thereon adapted to slide on the frame, said spring being connected at its one end to the drum and at its other end to said ring.

In testimony whereof I affix my signature in presence of two witnesses.

ALEXANDER McGREGOR.

Witnesses:
GEORGE WOLFE BRUCE,
ROBERT A. THOMPSON.